United States Patent [19]
Coffland

[11] Patent Number: 5,431,472
[45] Date of Patent: Jul. 11, 1995

[54] CONVERTIBLE PICKUP SIDE RAIL APPARATUS

[75] Inventor: Ronald G. Coffland, Lewiston, Id.

[73] Assignee: Technic Tool Corporation, Lewiston, Id.

[21] Appl. No.: 133,553

[22] Filed: Oct. 6, 1993

Related U.S. Application Data

[63] Continuation-in-part of Ser. No. 936,020, Aug. 25, 1992, abandoned.

[51] Int. Cl.$^6$ ............................................... B60R 9/06
[52] U.S. Cl. ........................................... 296/3; 296/10; 296/41; 224/403; 224/405; 410/110
[58] Field of Search .................. 296/3, 10, 41, 11–14; 410/110, 116; 224/42.45 R; 211/169.1

[56] References Cited

U.S. PATENT DOCUMENTS

| | | | |
|---|---|---|---|
| 265,878 | 10/1982 | Shafer | 296/11 |
| 1,214,681 | 2/1917 | Jacobs | 211/169.1 |
| 1,668,401 | 5/1928 | French | 296/3 |
| 3,460,864 | 8/1969 | Piercy | 296/3 |
| 3,891,262 | 6/1975 | Brunel | 296/3 |
| 4,398,763 | 8/1983 | Louw | 296/3 |
| 4,604,013 | 8/1986 | Elwell et al. | 410/106 |
| 4,659,131 | 4/1987 | Flournoy, Jr. | 296/3 |
| 4,770,458 | 9/1988 | Burke et al. | 296/3 |
| 5,002,324 | 3/1991 | Griffin | 296/3 |
| 5,009,457 | 4/1991 | Hall | 296/3 |
| 5,037,152 | 8/1991 | Hendricks | 296/3 |
| 5,108,141 | 4/1992 | Anderson | 296/3 |
| 5,143,415 | 9/1992 | Boudah | 296/3 |
| 5,152,570 | 10/1992 | Hood | 296/3 |
| 5,190,195 | 3/1993 | Fulhart et al. | 224/42.45 R X |
| 5,255,951 | 10/1993 | Moore, III | 296/3 |

*Primary Examiner*—Dennis H. Pedder
*Attorney, Agent, or Firm*—Wells, St. John, Roberts, Gregory & Matkin

[57] ABSTRACT

A pickup truck side rail apparatus includes paired front and rear rail members which are pivotally mountable to opposed sidewalls along a truck bed. The rail members are stored in lowered positions in which they extend longitudinally above and parallel to the sidewalls. They are vertically spaced from the sidewalls to form longitudinal side rails above and along the sidewalls. The rail members are pivotal to upright positions. In their upright positions, the rail members extend vertically from the front and rear ends of the opposed sidewalls. A pair of overhead cross-bars can be mounted between the transversely aligned rail members when in their upright positions. The overhead cross-bars extend transversely above the pickup truck bed to form an overhead rack for carrying lengthy objects above the truck bed and cab.

5 Claims, 8 Drawing Sheets

CONVERTIBLE PICKUP SIDE RAIL APPARATUS

RELATED APPLICATIONS

This is a continuation-in-part of U.S. patent application Ser. No. 07/936,020, filed Aug. 25, 1992, entitled "Convertible Pickup Side Rail Apparatus," now abandoned.

TECHNICAL FIELD

This invention relates to foldable side rail assemblies for pickup truck beds. They are movably mounted to form supports for cross members that serve as an overhead rack.

BACKGROUND OF THE INVENTION

Pickup trucks at one time were used primarily as utility vehicles. However, they have recently become quite popular as passenger vehicles. Along with this popularity has come increasing attention to their appearance, as well as utility in transporting items.

A variety of pickup truck accessories are manufactured and widely available, a number of which are valued as much for their appearance as for their function. For instance, rollbars are often provided for the ostensible purpose of enhancing vehicle occupant safety during a rollover. However, rollbars are usually purchased primarily based upon aesthetic considerations, with only minimal consideration for safety enhancement.

Many pickup truck accessories, in fact, serve a dual purpose of improving appearance and providing utility. Headliners, light rails, running boards, tailgate protectors, decorative grills, and mud flaps are examples of such accessories.

Side rails are examples of pickup truck accessories providing both look and function. Conventional side rails are fixed along the top surfaces of the sidewalls at each side of a truck bed. They provide hand-holds for users of a truck while working in and around it, as well as convenient attachment locations for ropes and other tie-downs used to secure loads. If appropriately styled and finished, they also enhance the appearance of a pickup truck bed while providing these functional purposes.

Figure 1:
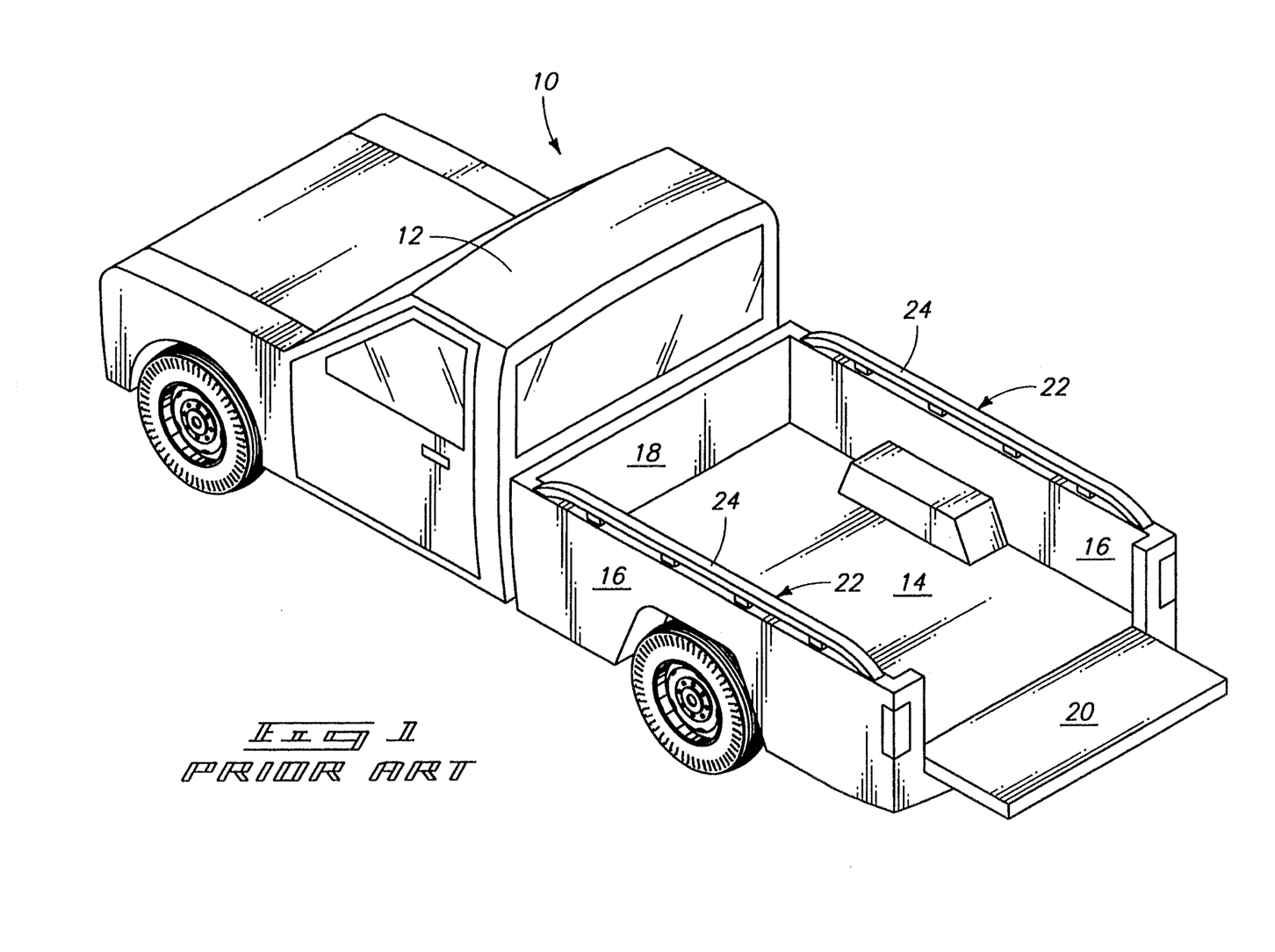
FIG. 1 is a perspective view of a pickup truck having prior art side rails.

FIG. 1 shows a conventional pickup truck 10 having a cab 12 and a pickup truck bed 14. The truck bed 14 has sidewalls 16, a front wall 18 and a tailgate 20. Conventional, prior art side rails 22 are mounted atop sidewalls 16 along their longitudinal length. Side rails 22 generally comprise elongated horizontal tubes which are vertically spaced above the top surface of sidewalls 16. They are supported at several locations spaced longitudinally along the length of sidewalls 16. The size, shape and appearance of side rails 22 are normally chosen with particular regard for the resulting overall appearance of the pickup truck.

In contrast to side rails and other pickup truck accessories mentioned above, many pickup truck accessories remain primarily functional in nature. Overhead utility racks are particular examples of such functional accessories. Such racks have typically been designed with little or no regard for appearance. They detract, often significantly, from a pickup truck's appearance as a passenger vehicle. They are also removable only with considerable difficulty. When removed from the truck, they require significant storage space. While removable and/or collapsible utility racks have been proposed, they have only reduced, rather than eliminated, the above drawbacks and disadvantages of such racks.

The present invention is a side rail apparatus which provides the aesthetic features of side rails which are desired by many pickup truck owners. In addition, the side rail apparatus, with very little effort, can be configured to provide the highly utilitarian function of an overhead utility rack for those infrequent times when such a utility rack is needed by a typical pickup truck user.

BRIEF DESCRIPTION OF THE DRAWINGS

Preferred embodiments of the invention are described below with reference to the accompanying drawings:

FIG. 6 is an enlarged top view of the mounting brackets shown in FIGS. 2 and 3, the rail members being removed for purposes of illustration;

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

Figure 2:
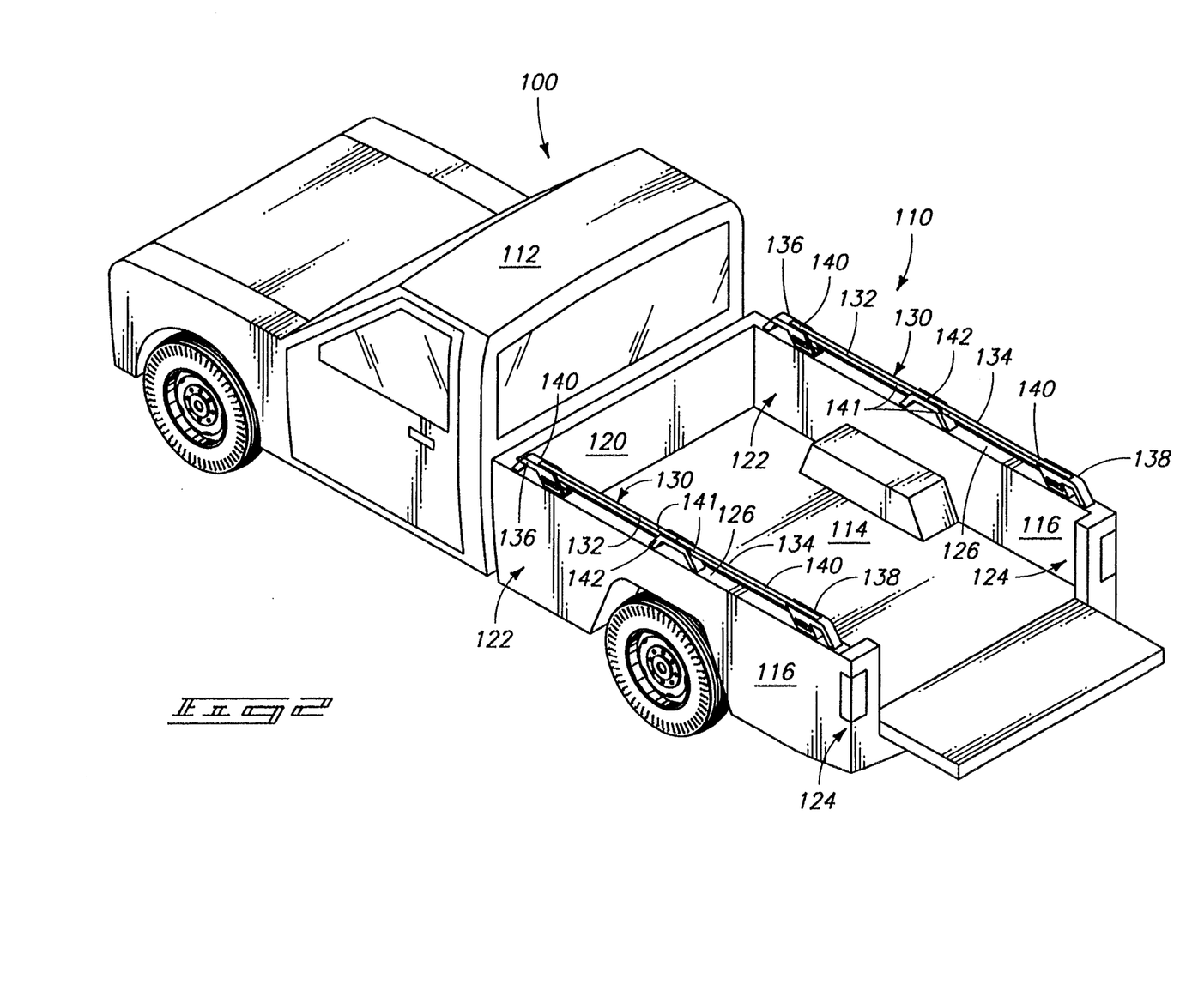
FIG. 2 is a perspective view of a pickup truck having a preferred embodiment of the side rail apparatus constructed in accordance with the invention, the side rail apparatus being configured as side rails.
Figure 3:
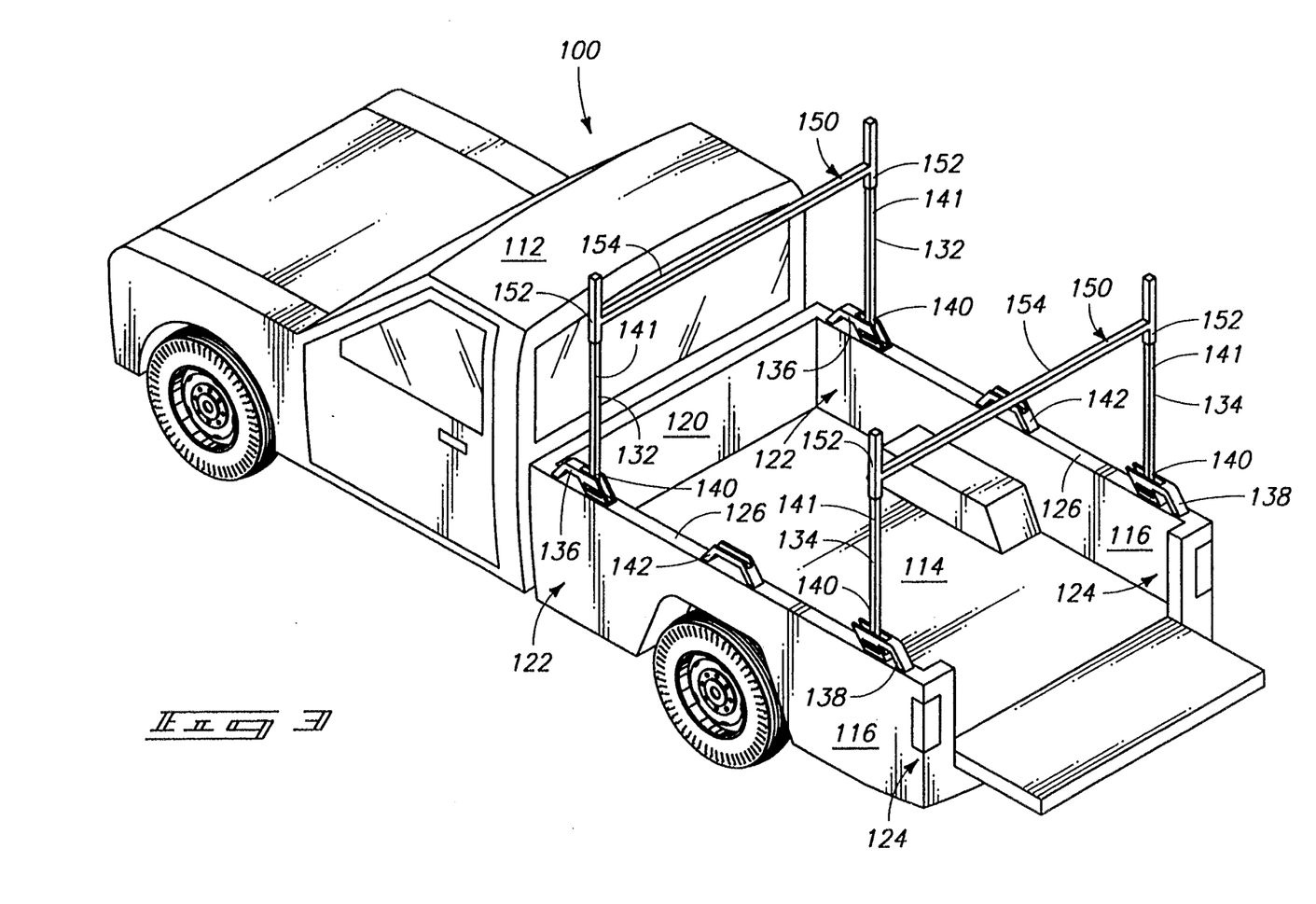
FIG. 3 is a perspective view of the pickup truck and side rail apparatus shown in FIG. 2, the side rail apparatus being configured as an overhead rack.

FIGS. 2 and 3 illustrate a preferred embodiment of a foldable side rail apparatus in accordance with the invention. The side rail apparatus comprises forward and rearward rail members 132 and 134 which are pivotally mountable to the front and rear ends, respectively, of opposed pickup truck sidewalls 116. The rail members are normally positioned in lowered positions (FIG. 2) in which they are vertically spaced from the sidewalls to form longitudinal side rails above and along the sidewalls. The rail members are movable from their side rail positions to upright positions (FIG. 3) in which they extend vertically from the front and rear ends of the opposed sidewalls. Overhead cross-bars 150 are mountable between the forward and rearward rail members, respectively, when the rail members are in their upright positions. The overhead cross-bars extend transversely above the pick-up bed to form a rack for supporting longitudinal loads (not shown) extending over the pickup truck bed and cab.

More specifically, FIG. 2 shows a pickup truck 100 with the side rail apparatus 110 in a side rail configuration. Pickup truck 100 includes a cab 112 and a truck bed 114 that is bounded by transversely spaced sidewalls 116 and a front wall 120. Sidewalls 116 extend from a front end 122 to a rear end 124. Each has an upper surface 126 extending longitudinally from its front end 122 to its rear end 124.

The pickup truck side rail apparatus 110 includes a pair of side rail assemblies 130, one of which is mountable to the upper surface 126 of each opposed sidewall 116. Each side rail assembly 130 includes a front rail member 132 and a rear rail member 134. When in the side rail configuration, as shown in FIG. 2, rail members 132 and 134 extend horizontally and longitudinally above sidewall upper surfaces 126.

Rail members 132 and 134 are preferably lengths of square tubing which are sized, shaped, and positioned to form visually pleasing side rails extending along the length of sidewalls 116. Accordingly, while the preferred embodiment shows rail members 132 and 134 being constructed of square tubing, it may be desirable, depending on the appearance desired, to provide differently shaped rail members.

FIG. 3 shows the side rail apparatus 110 configured as an overhead rack. In this configuration, the rail members 132 and 134 are pivoted to upright positions in which they extend vertically upward from the front and rear ends 122 and 124 the sidewalls 116. The rail members thus form vertical supporting uprights at each corner of the truck bed 114.

A pair of overhead cross-bars 150 are mounted between the forward and rearward rail members 132 and 134, respectively, of each side rail assembly 130. They extend transversely above the pickup truck bed 114. Lengthy objects, such as pipes or lumber, can be supported above the truck bed 114 and cab 112 by the rigid cross-bars 150.

Each side rail assembly 130 includes a front mounting bracket or pivot mount 136 and a rear mounting bracket or pivot mount 138 that mounts the rail members 132 and 134 to the sidewalls 116. The mounting brackets 136 and 138 are suitably attached to the front and rear ends 122 and 124, respectively, of upper surfaces 126. In addition, each side rail assembly 130 includes an intermediate mounting bracket 142 on sidewall 116, positioned approximately midway between front and rear mounting brackets 136 and 138. Suitable connectors such as bolts or screws are used to fasten and position the mounting brackets relative to upper surfaces 126. Such bolts or screws extend through holes in upper surfaces 126. During installation, appropriate templates can be used to accurately position such holes.

The front, rear, and intermediate mounting brackets 136, 138, and 142, as well as rail members 132 and 134, are sized and shaped to position rail members 132 and 134 horizontally above and vertically spaced from the upper surfaces 126 of the opposed sidewalls 116. The arrangement leaves a series of open gaps between the rail members and upper surfaces 126 of the sidewalls when the rail members are in their lowered positions.

Forward and rearward rail members 132 and 134 each have an inner end 140 and an outer end 140 and 141. Their inner ends 140 are pivotally mounted to the front and rear mounting brackets 136 and 138, respectively, to pivot about transverse pivot axes located above the upper surfaces 126. Their outer ends 141 are receivable within the intermediate mounting brackets 142 so that the lowered rail members 132 and 134 can serve as longitudinal rails above the sidewall upper surfaces 126. Each rail member 132, 134 is pivotable to an upright position extending vertically upward from the front or rear mounting brackets 136 and 138 arranged longitudinally along the sidewalls 116.

A pair of overhead cross-bars 150 are mountable between the outer ends 141 of the upright forward and rearward rail members 132 and 134, respectively. Each overhead cross-bar 150 is releasably connected to two transversely aligned rail members.

The individual cross-bars 150 comprise a pair of end brackets 152 which are removably mounted to the outer ends 141 of rail members 132 and 134. A rigid cross-member 154 extends transversely between the end brackets 152 and above pickup truck bed 114.

Each end bracket 152 is an elongated post member, preferably comprising an elongated tube with an inner diameter complementary to the outer diameter of the corresponding rail member. This size relationship permits the outer ends of the upright rail members to be received within the elongated tubes. A stop (not shown) within each elongated tube limits the depth to which the outer end of a rail member can be inserted within the elongated tube. The elongated post members extend generally vertically from the outer ends 141 of the rail members. Appropriate removable retaining means, clips, or pins (not shown), can be utilized used to retain cross-bar 150 on the supporting rail members 132 and 134.

The elongated tubes which form end brackets 152 have lengths sufficient to extend vertically above the cross-members 154 to assist in retaining cargo supported on the cross-members 154.

Hooks or other brackets (not shown) can be provided in pickup truck bed 114 for storing the removable cross-bars 150 when the side rail apparatus 110 is configured as side rails. Alternatively, cross-bars 150 can be stored loosely within the truck bed 114 or can be stored externally to the truck 100.

Cross-bars 150, in addition to supporting overhead cargo, provide transverse bracing between transversely-opposed rail members 132 and 134, adding rigidity to the overall structure when configured as an overhead rack. In addition, it may be desirable in some situations to provide longitudinal bracing for the upright rail members. With heavy cargo loads, such longitudinal bracing might be required to prevent collapse or folding of the upright rail members during sudden accelerations or stops. The bracing could take the form of elongated beams or rails removably mounted to extend generally longitudinally and downwardly from the outer ends of the rail members to either another rail member or to sidewall upper surface 126.

Figure 4:
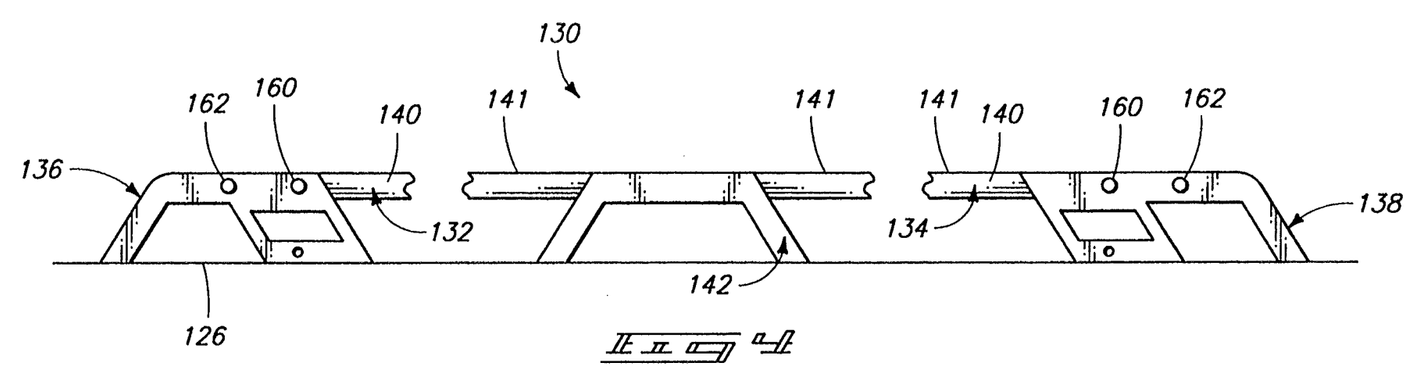
FIG. 4 is an enlarged side view of the mounting brackets shown in FIGS. 2 and 3, the rail members being in their lowered positions.
Figure 5:
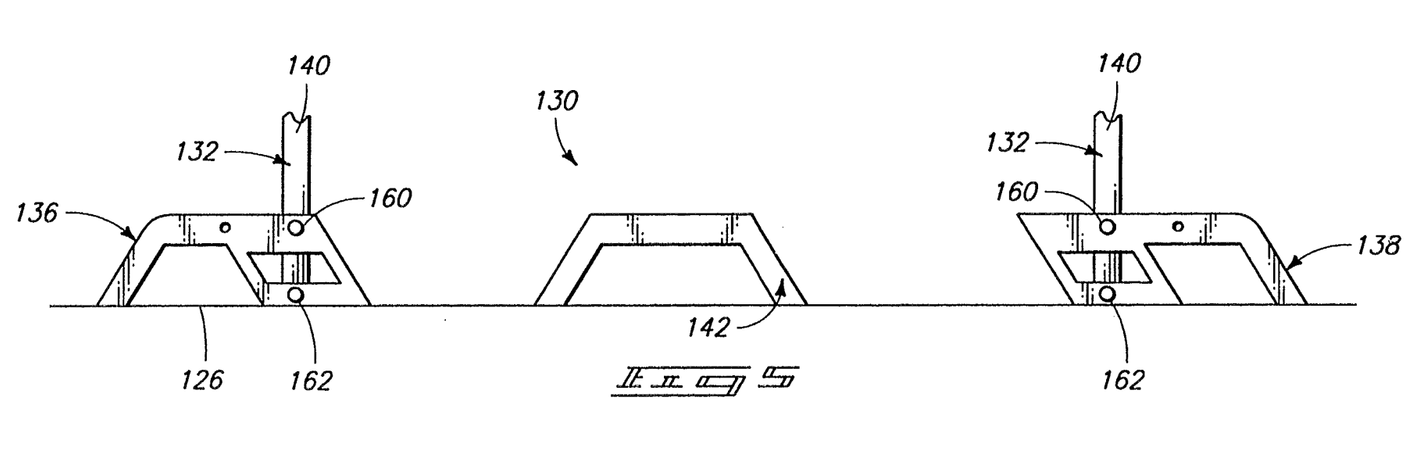
FIG. 5 is an enlarged side view of a the mounting brackets shown in FIGS. 2 and 3, the rail members in their upright positions.

FIGS. 4–6 show mounting brackets 136, 138, and 142 in detail. The front and rear mounting brackets 136 and 138 are identical in functional detail, even though they are shaped somewhat differently for decorative purposes.

Each of the front and rear mounting brackets 136 and 138 extends upwardly from upper surface 126 of sidewall 116 to provide a horizontal transverse pivot axis about which a corresponding rail member pivots. More specifically, mounting brackets 136 and 138 have transversely spaced walls 156 which extend upwardly from sidewall 116 to form an upwardly open channel 158 extending longitudinally along the top of pickup truck sidewall 116. The width of channel 158 is sufficient to receive an inner end 140 of a rail member therebetween.

Inner ends 140 are movably mounted within channels 158 so that rail members 132 and 134 can pivot about a transverse pivot axis which is vertically spaced above upper surface 126 of sidewall 116. More specifically, a pivot pin 160 extends through the upper portions of channel walls 156. Pivot pin 160 extends through channel 158 and through an aperture extending through the inner end 140 of a rail member. The rail member is free to pivot about the center of pivot pin 160. Pivot pin 160, which serves as a pivot shaft, is vertically spaced above the upper surfaces 126 of sidewalls 116.

The hinged or pivoting mounting arrangement described above allows the rail members to pivot between lowered horizontal positions, in which the front and rear rail members 132 and 134 are longitudinally aligned with and extend toward each other, to raised upright positions, in which the rail members extend vertically from their supporting front and rear mounting brackets 136 and 138.

When configured as side rails, the outer ends 141 of each set of rail members 132 and 134 are removably received and supported by an intermediate mounting bracket 142 located midway along the sidewall 116 between its supporting front and rear mounting brackets 136 and 138. In this configuration, rail members 132 and 134 form longitudinal side rails spaced above and parallel to the sidewall upper surfaces 126.

Each of the intermediate mounting brackets 142 extends upwardly from upper surfaces 126 of sidewalls 116, forming an upwardly open channel 164 which receives and supports the outer ends of rail members 132 and 134 at an elevation above and spaced from upper surfaces 126. The spaced elevation of the rail members is constant along their respective lengths.

Front and rear mounting brackets 136 and 138 preferably include locking means for alternately retaining rail members 132 and 134 in their upright positions or in their side rail positions. The locking means comprise lock pins 162, which may be spring pins or similar devices, which extend through mounting brackets 136 and 138 and through channels 158. Appropriate apertures are positioned in the front and rear mounting brackets 136 and 138 to receive and position lock pins 162 to thereby retain the rail members 132 and 134 in their lowered or upright positions.

The inner end of each rail member 132 and 134 extends within channel 158 beyond the connecting pivot pin 160. When in the upright position, the inner ends of the rail members 132 and 134 extend downwardly from pivot pins 160. When in the lowered or side rail position, the inner ends of the rail members 132 and 134 extend longitudinally outward beyond the pivot pins 160, while remaining within channel 158. Apertures are located in mounting brackets 136 and 138 below pivot pins 160 for retaining rail members 132 and 134 in their upright positions. Apertures are also spaced in mounting brackets 136 and 138 longitudinally from pivot pin 160 for retaining rail members 132 and 134 in their lowered or side rail positions.

Figure 7:
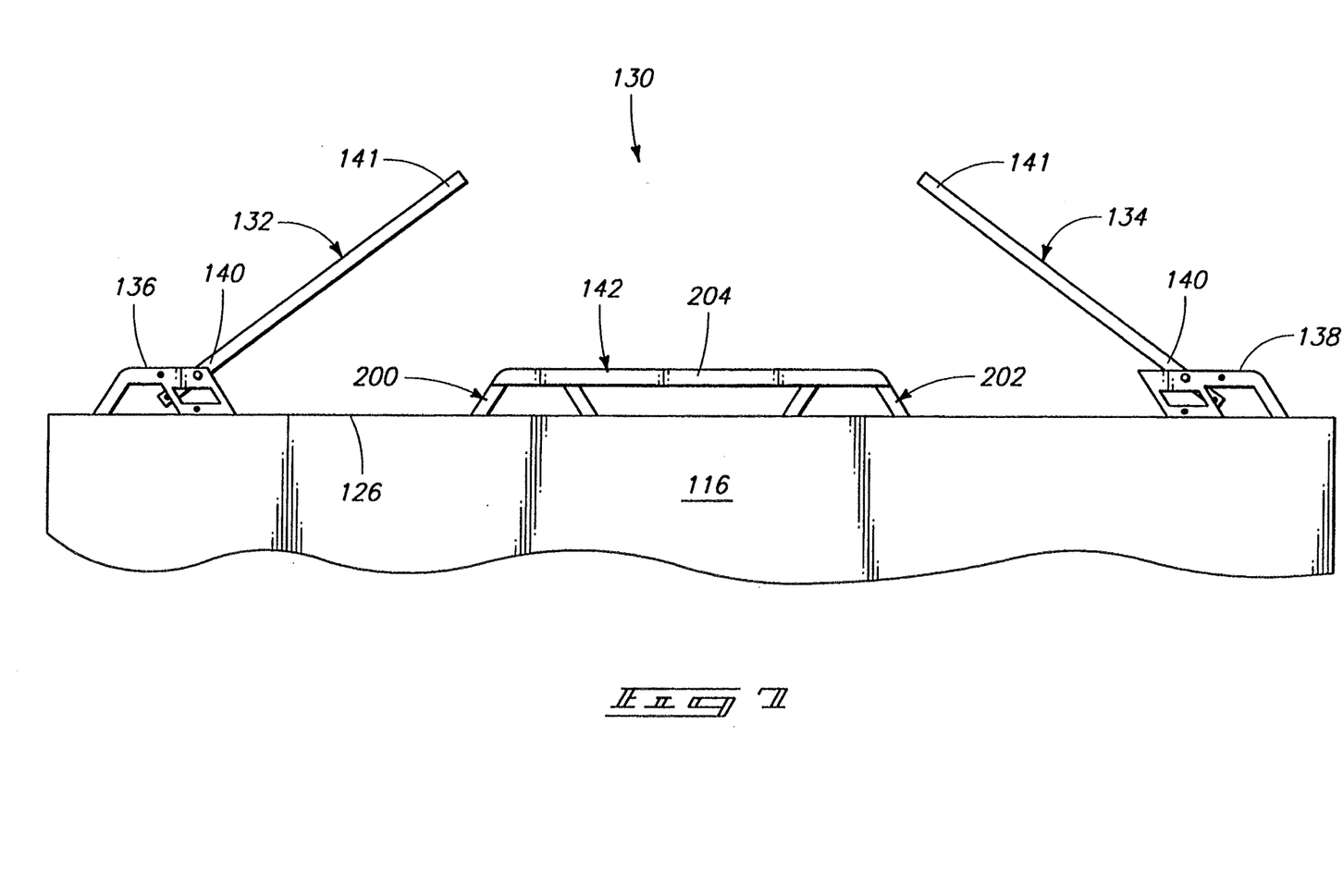
FIG. 7 is a side view of an alternative embodiment side rail apparatus in accordance with the invention.

FIG. 7 shows an alternative embodiment of the side rail apparatus of this invention. This embodiment accommodates longer pickup truck beds in which rail members extending along the full length of the pickup truck bed would result in an overhead rack of excessive height. The embodiment of FIG. 7 is identical to the embodiment already described except for the construction of intermediate mounting brackets 142.

In FIG. 7, each intermediate mounting bracket comprises a pair of intermediate supports 200 and 202 plus a rail 204. The supports 200 and 202 are longitudinally spaced from one another. The longitudinal rail 204 is fixed to and extends between the supports 200 and 202. The outer ends 141 of rail members 132 and 134 are selectively received within short channels or receptacles that are upwardly open at the outer ends of the rail 204. The remainder of rail 204 between these open channels is fully enclosed to complement the appearance of the remainder of the side rail assembly.

Figure 8:
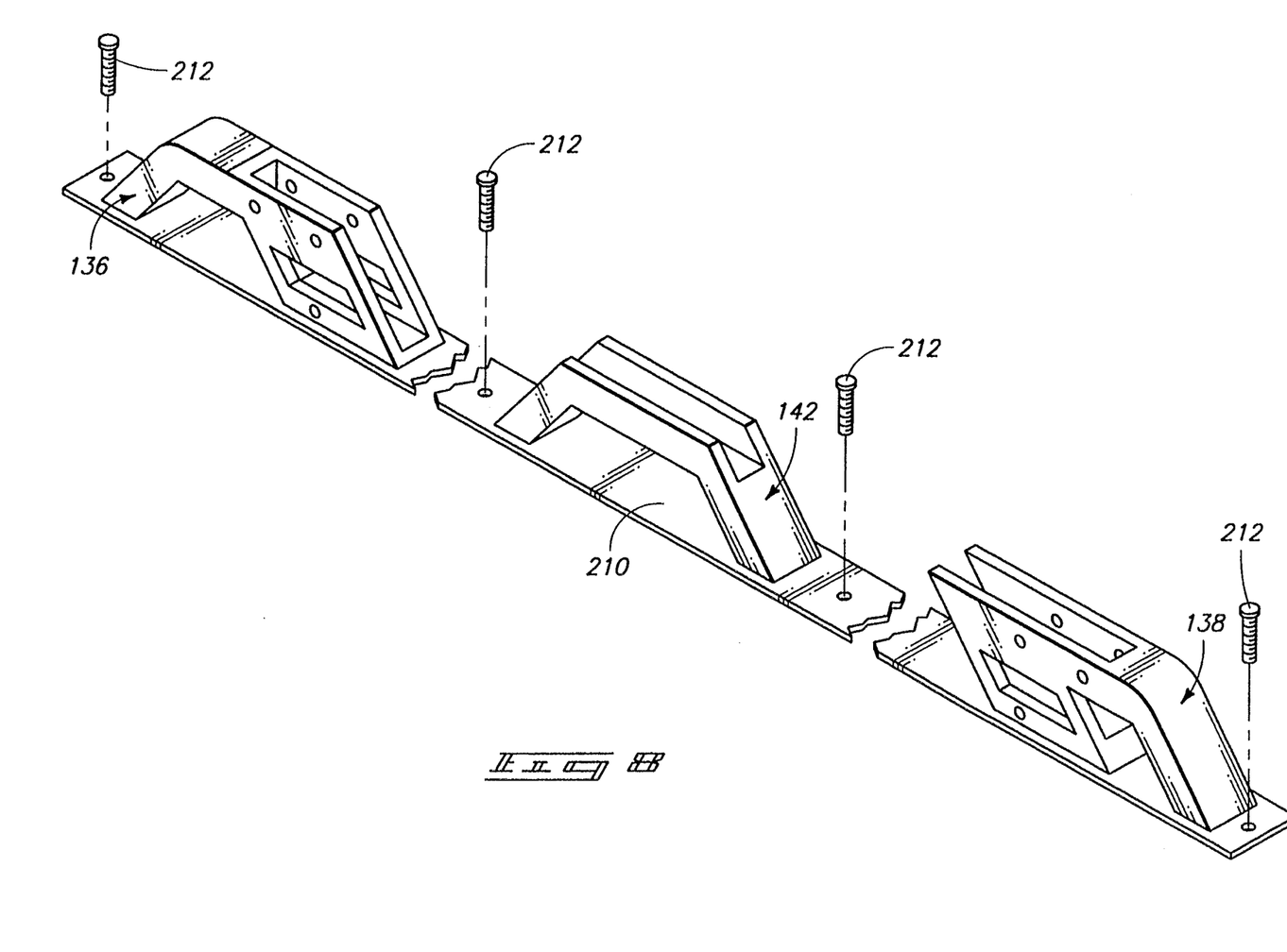
FIG. 8 shows an alternative manner of attaching the mounting brackets of a side rail apparatus to a pickup truck sidewall.

FIG. 8 shows an alternative manner of attaching the mounting brackets of a side rail assembly 130 to a pickup truck sidewall. As shown, each of mounting brackets 136, 138, and 142 is permanently attached to a longitudinally-extending mounting plate or runner 210. Mounting plate 210 is similar in size to the upper surface of a pickup sidewall. Mounting plate 210 can be fastened above and along such a sidewall by a plurality of connectors such as bolts or screws 212 which extend vertically through mounting plate 210 and through the pickup sidewall upper surface. Mounting side rail assembly in this manner allows the brackets to be accurately spaced and aligned when fabricated, rather than requiring such spacing and alignment by a purchaser during installation on a pickup.

Figure 9:
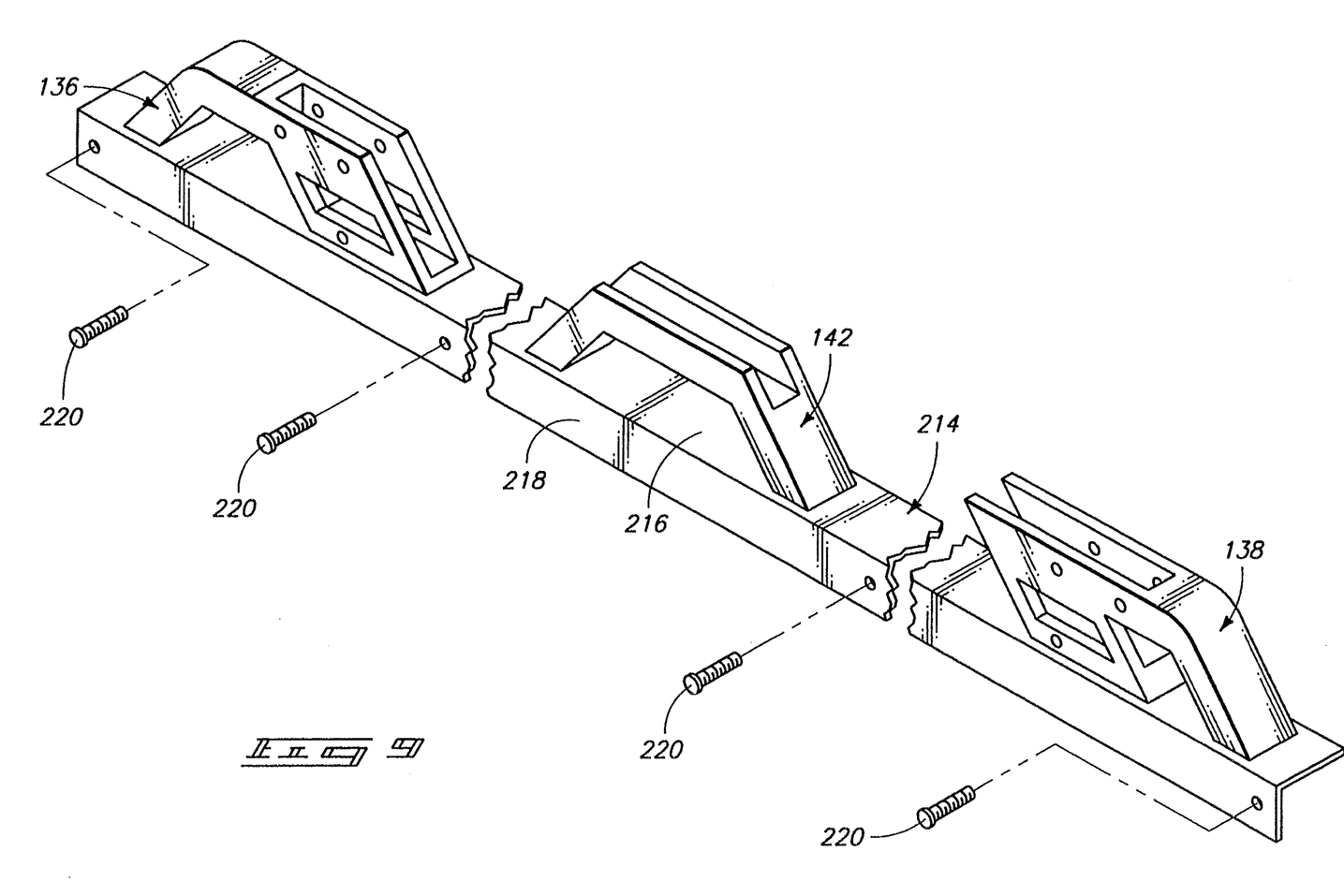
FIG. 9 shows another alternative manner of attaching the mounting brackets of a side rail apparatus to a pickup truck sidewall.

FIG. 9 shows another alternative manner of attaching the side rail mounting brackets to a pickup truck sidewall. In FIG. 9, mounting brackets 136, 138, and 142 are again attached to a longitudinally-extending mounting plate or runner, designated in FIG. 9 by the reference numeral 214. However, mounting plate 214 has an upper portion 216 and a lower flange 218. Upper portion 216 rests atop a pickup truck sidewall in a manner similar to mounting plate 210 described above. Flange 218 extends downward, along an inside edge of the sidewall, from upper portion 216. Flange 218 provides lateral alignment of mounting plate 214 along the pickup truck sidewall, as well as providing a convenient means of attaching mounting plate 214 to the sidewall. A plurality of connectors such as bolts or screws 220 extend horizontally through mounting plate flange 218 and through an inner wall or surface of the pickup sidewall. Bolts or screws 220 are thus positioned on the insides of the pickup sidewalls rather than on their tops. This results in a more attractive appearance, both when the side rails are installed and in the event that they are later removed. After removal, the holes left by the fastening bolts or screws will not be as visible as if they were located on the sidewall upper surfaces.

The invention described above provides functional and aesthetically pleasing side rails similar in appearance to conventional side rails. With minimal effort, however, the side rails can be pivoted upwardly and fitted with cross-bars to form an overhead utility rack. The apparatus is especially useful for pickup truck owners who only infrequently require use of an overhead rack, but who want to preserve the attractive appearance of their pickup truck when the overhead rack is not needed.

The disclosed side rail assembly readily converts a pickup truck into an appropriate vehicle for use as both a utility vehicle and as a family vehicle. It can be designed to become a sporty, attractive accessory for the truck. It provides all the utility and elevated load carrying capacity of conventional rigid welded racks, and also improves the appearance of the truck, whether the side rail units are upright or lowered.

Decorative rails are increasingly being purchased as pickup truck accessories. They are permanently bolted to the top surfaces of the sidewalls along the truck bed cargo space. The foldable side rail assembly not only provides the desired decorative effect of rails when collapsed, but is also attractive when erected for carrying cargo on the elevated cross members.

The assembly provides an effective utility rack for carrying long loads extending beyond the truck cab. It provides a rack that never needs to be unbolted and removed from the truck, regardless of the type of cargo being transported.

The side rail units have a simplified construction readily adaptable to truck beds of various lengths and widths. Common elements included within the units can be used with elongated tubular elements of varying lengths to accommodate the need to match vehicle dimensions.

The side rail units are easily attached to the supporting truck body sidewalls by bolts or other suitable fasteners. They provide simple, quick erecting and collapsing movements that require no special skills or tools.

The side rails meet the usual utility requirements of a cargo rack when expanded vertically. While conventional racks must be removed from a truck and stored when not in use, this assembly can be stored in place when disassembled and folded. As a consequence the rack is always available when needed. When collapsed, it does not interfere with normal uses of the truck bed. Tall cargo, such as refrigerators, compressed gas cylinders, etc. that would engage normal rack units, can be fitted into the truck bed with no problem. Because the front and back rail members can be erected independently of one another, such large objects can also be stabilized within a truck bed by securing them to the forward upright unit.

The front frame of this assembly can also be used alone when it is preferred that the back end of long loads rest on the truck bed for easy loading and unloading. Alternatively, the rear frame can be used by itself to help support loads that must overhang the back end of the truck bed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A foldable rail apparatus for mounting to a pickup truck bed bounded by sidewalls having longitudinally extending upper surfaces, comprising:
    a set of three discrete front, intermediate, and rear mounting brackets each having a bottom surface for securing the mounting bracket to the upper surface of a pickup truck sidewall with the respective mounting brackets in longitudinally, aligned and spaced positions;
    a pair of front and rear rail members movably supported on the set of mounting brackets, each rail member having an inner end and an outer end;
    the front and rear mounting brackets each including transversely spaced walls which extend upwardly between their bottom surfaces and transversely spaced upper edges that are parallel to the bottom surfaces to form an upwardly open channel extending longitudinally along the brackets, the inner ends of the rail members being received between the channels of the respective brackets;
    the intermediate bracket including transversely spaced walls which extend upwardly between their bottom surfaces and transversely spaced upper edges that are parallel to the bottom surfaces to form an upwardly open channel to receive and elevationally support the outer ends of the rail members in longitudinal alignment with one another;
    pivot pins extending transversely through the front and rear rail members and the upper portions of the channels of the front and rear mounting brackets, respectively, at locations vertically spaced above the bottom surfaces of the mounting brackets for movement of the rail members between (1) upright positions extending vertically upward from the mounting brackets where the rail members are supported only by the front and rear mounting brackets to permit the rail members to serve as supporting uprights for transverse cross-bars, and (2) lowered positions extending parallel to and constantly spaced above the bottom surfaces of the mounting brackets where the outer ends of the rail members are also releasably supported by the intermediate mounting bracket to permit the rail members to serve as longitudinal rails with open gaps under them along longitudinal spaces between the mounting brackets;
    the inner ends of the rail members being extended beyond the connecting pivot pins and within the channels of the respective front and rear mounting brackets; and
    releasable lock pins alternately (1) engaging the extended inner ends of the rail members and the mounting brackets at locations below the pivot pins for retaining the rail members in their upright positions, or (2) engaging the extended inner ends of the rail members at locations beyond the pivot pins for retaining the rail members in their lowered positions.

2. The foldable rail apparatus of claim 1 wherein the releasable lock pins extend through the inner ends of the rail members and aligned apertures formed across the channels of the respective front and rear mounting brackets.

3. The foldable rail apparatus of claim 1 wherein the rail members are flush with and substantially fill the areas across the upper edges of the respective channels on the three mounting brackets when the rail members are in their lowered positions.

4. A foldable rail apparatus for mounting to a pickup truck bed bounded by sidewalls having longitudinally extending upper surfaces, comprising:
    two sets of three discrete front, intermediate, and rear mounting brackets each having a bottom surface for securing the mounting bracket to the upper surface of a pickup truck sidewall with the respective mounting brackets of each set in longitudinally aligned and spaced positions;
    two sets of paired front and rear rail members movably supported on the respective sets of mounting brackets, each rail member having an inner end and an outer end;

the front and rear mounting brackets each including transversely spaced walls which extend upwardly between their bottom surfaces and transversely spaced upper edges that are parallel to the bottom surfaces to form an upwardly open channel extending longitudinally along the brackets, the inner ends of the rail members being received between the channels of the respective brackets;

each intermediate bracket including transversely spaced walls which extend upwardly between their bottom surfaces and transversely spaced upper edges that are parallel to the bottom surfaces to form an upwardly open channel to receive and elevationally support the outer ends of one pair of the rail members in longitudinal alignment with one another;

pivot pins extending transversely through the front and rear rail members and upper portions of the channels of the front and rear mounting brackets of each set, respectively, at locations vertically spaced above the bottom surfaces of the mounting brackets for movement of the rail members between (1) upright positions extending vertically upward from the mounting brackets where the rail members are supported only by the from and rear mounting brackets to permit the rail members to serve as supporting uprights for transverse cross-bars, and (2) lowered positions extending parallel to and constantly spaced above the bottom surfaces of the mounting brackets where the outer ends of the rail members are also releasably supported by the intermediate mounting bracket to permit the rail members to serve as longitudinal rails with open gaps under them along longitudinal spaces between the mounting brackets;

the inner ends of the rail members being extended beyond the connecting pivot pins and within the channels of the respective front and rear mounting brackets;

releasable lock pins alternately (1) engaging the extended inner ends of the rail members and the mounting brackets at locations below the pivot pins for retaining the rail members in their upright positions, or (2) engaging the extended inner ends of the rail members at locations beyond the pivot pins for retaining the rail members in their lowered positions; and a pair of removable overhead cross-bars extending respectively between the outer ends of the front rail members and the rear rail members while the rail members are in their upright positions.

5. The foldable rail apparatus of claim 4, wherein each overhead cross-bar comprises:

pair of end brackets removably mounted to the outer ends of the rail members when in their upright positions; and a cross-member rigidly connected to the pair of end brackets.

* * * * *